United States Patent [19]

Tarlton et al.

[11] Patent Number: 5,526,913
[45] Date of Patent: Jun. 18, 1996

[54] LOW PROFILE MANUAL ADJUSTMENT MECHANISM FOR A FRICTION TORQUE DEVICE

[75] Inventors: James K. Tarlton, Auburn; Rodney W. Pegg, Angola, both of Ind.

[73] Assignee: Dana Corporation, Toledo, Ohio

[21] Appl. No.: 424,138

[22] Filed: Apr. 17, 1995

[51] Int. Cl.⁶ .............................. F16D 11/00; F16D 13/75
[52] U.S. Cl. ................................. 192/70.25; 192/111 B; 411/116; 411/965
[58] Field of Search ............................ 192/70.25, 111 B; 411/119, 120, 81, 974, 965, 116, 131

[56] References Cited

U.S. PATENT DOCUMENTS

| | | |
|---|---|---|
| 431,705 | 7/1890 | McCarthy . |
| 887,382 | 5/1908 | Diplock . |
| 1,016,427 | 2/1912 | Morse . |
| 2,758,691 | 8/1956 | Palm . |
| 4,735,533 | 4/1988 | Gallagher et al. . |
| 4,953,680 | 9/1990 | Flotow et al. . |

*Primary Examiner*—Andrea L. Pitts
*Attorney, Agent, or Firm*—Dykema Gossett

[57] ABSTRACT

An adjustment mechanism for a clutch is partially recessed within a clutch cover. The disclosed adjustment mechanism includes a support bracket, a rotation assembly, and a locking plate. The support bracket includes a web and a pair of side walls defining a U-shaped channel. Each side wall includes a flange on one end of the side wall opposite the web. Each flange extends away from the channel generally parallel to the web of the support bracket. The rotational assembly is secured to the support bracket and includes a gear that cooperates with an adjusting ring of the clutch. A head of the rotation assembly is entirely received within the channel of the support bracket; thus, no portion of the rotation assembly extends from the channel beyond the flanges of the support bracket. Further, a locking plate is secured to the support bracket to selectively prevent rotation of the rotation assembly. Moreover, no portion of the locking plate extends from the channel of the support bracket beyond the flanges.

12 Claims, 2 Drawing Sheets

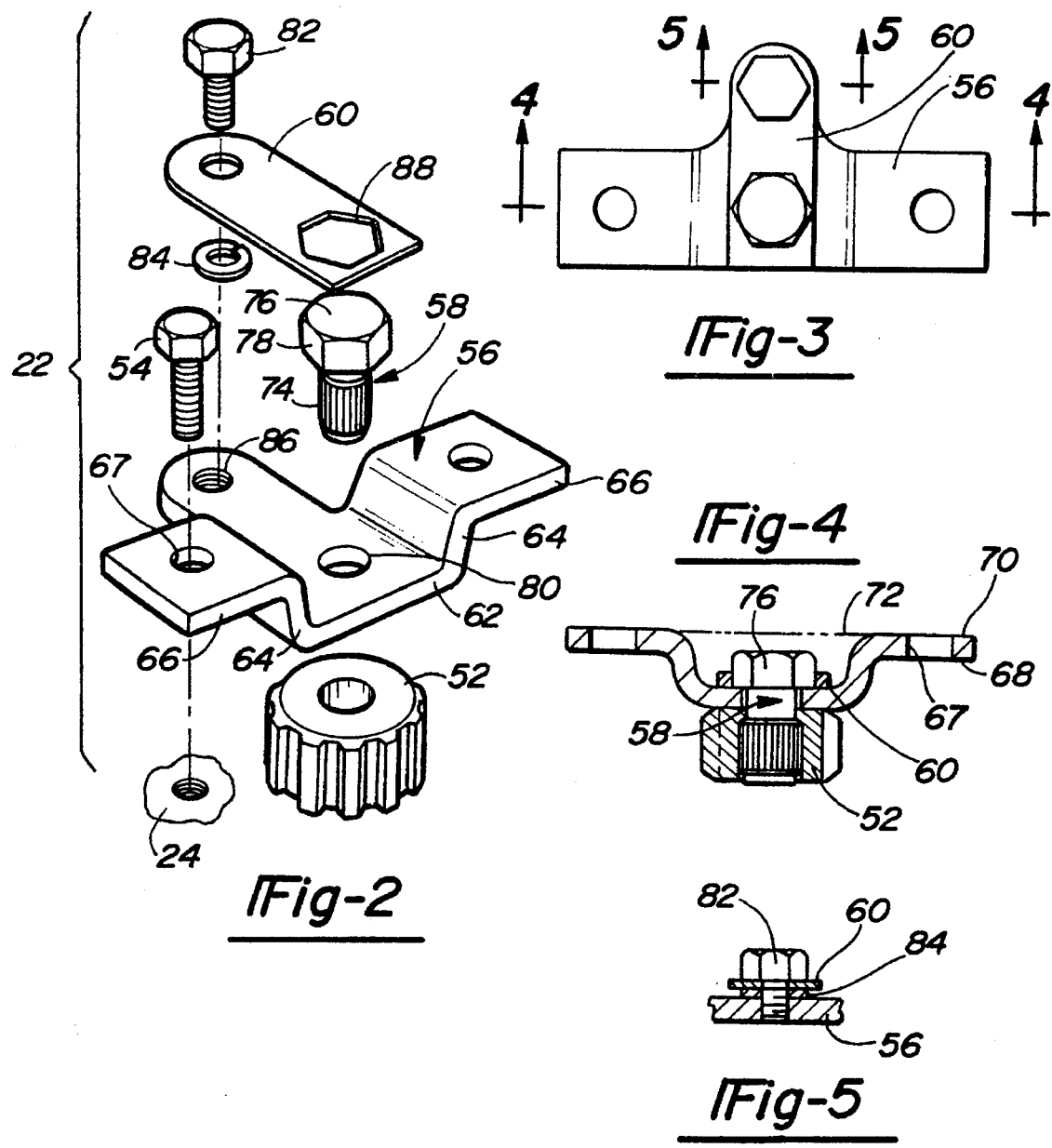

LOW PROFILE MANUAL ADJUSTMENT MECHANISM FOR A FRICTION TORQUE DEVICE

FIELD OF THE INVENTION

This invention relates generally to an adjustment mechanism for a friction torque transmitting device and, more particularly, to a manual adjustment mechanism partially recessed within a cover of the device.

BACKGROUND OF THE INVENTION

A torque transmitting device, and specifically a friction clutch, includes a driven member which frictionally engages a flywheel of an engine. When so engaged, torque is transmitted from the engine to a vehicle transmission through the clutch. The driven member of the clutch includes a friction surface for engaging a matin surface of the engine flywheel.

After normal wear has occurred on the friction surface, the clutch must be adjusted for efficient operation. In one known clutch, the adjustment is accomplished manually by rotation of an adjusting ring which is threadably coupled to a clutch cover. Teeth formed on the inner diameter of the adjusting ring cooperate with a gear of the adjustment mechanism. A head portion of the gear extends beyond a clutch cover so that the portion may be accessed for manual adjustment. Typically, an operator uses a tool to rotate the head portion of the gear, which in turn rotates the adjusting ring. The head portion of the gear in the conventional adjustment assembly often extends substantially beyond the cover, causing interference with neighboring components of the engine drive system, such as the clutch release assembly.

Further, the conventional manual adjustment mechanism includes some type of locking device to prevent unintentional rotation of the gear, and thus, undesired adjustment of the clutch. The locking member causes additional interference with neighboring components of the engine drive system.

It is therefore a goal of the present invention to provide a manual adjustment mechanism partially recessed within a clutch cover, in order to avoid interference with neighboring components. It is a further goal of the invention to provide an effective manual adjustment mechanism that incorporates a locking device to prevent unintentional adjustment of the clutch, wherein the entire assembly is free from contact with neighboring components while easily accessed for manual adjustment.

SUMMARY OF THE INVENTION

In a friction torque device, an adjustment mechanism is secured to and partially recessed within a cover for the torque device. The torque device includes a driving member and driven discs interleaved between the driving member and a pressure plate. As wear occurs on friction surfaces of the driven discs, the friction torque device is manually adjusted to accommodate the spacing between the interleaved members. The adjustment mechanism cooperates with an adjusting ring threaded to an inner diameter of the cover. The adjustment mechanism is partially recessed within the cover to avoid interference with neighboring components of the friction torque device, such as a release assembly.

The adjustment mechanism includes a support bracket, a rotation assembly and a locking plate. The support bracket includes a web and a pair of side walls defining a U-shaped channel. Each side wall includes a flange on one end of the side wall opposite the web. Each flange extends away from the channel generally parallel to the web of the support bracket. The rotational assembly is secured to the support bracket and includes a gear that cooperates with the adjusting ring of the friction torque device. A head of the rotation assembly is entirely received within the channel of the support bracket; thus, no portion of the rotation assembly extends from the channel beyond the flanges of the support bracket. Further, a locking plate is secured to the support bracket to selectively prevent rotation of rotation assembly. Moreover, no portion of the locking plate extends beyond the flanges of the support bracket.

These and other features of the present invention can be best understood from the following specification and drawings, of which the following is a brief description.

BRIEF DESCRIPTION OF THE DRAWINGS

FIG. 2 is an exploded perspective view of the components of the adjustment mechanism.

FIG. 3 is a top plan view of the adjustment mechanism.

FIG. 4 is a cross sectional view of the adjustment mechanism along the line 4—4 of FIG. 3.

FIG. 5 is a cross sectional view of the adjustment mechanism along the line 5—5 of FIG. 3.

DETAILED DESCRIPTION OF THE PREFERRED EMBODIMENT

Figure 1:
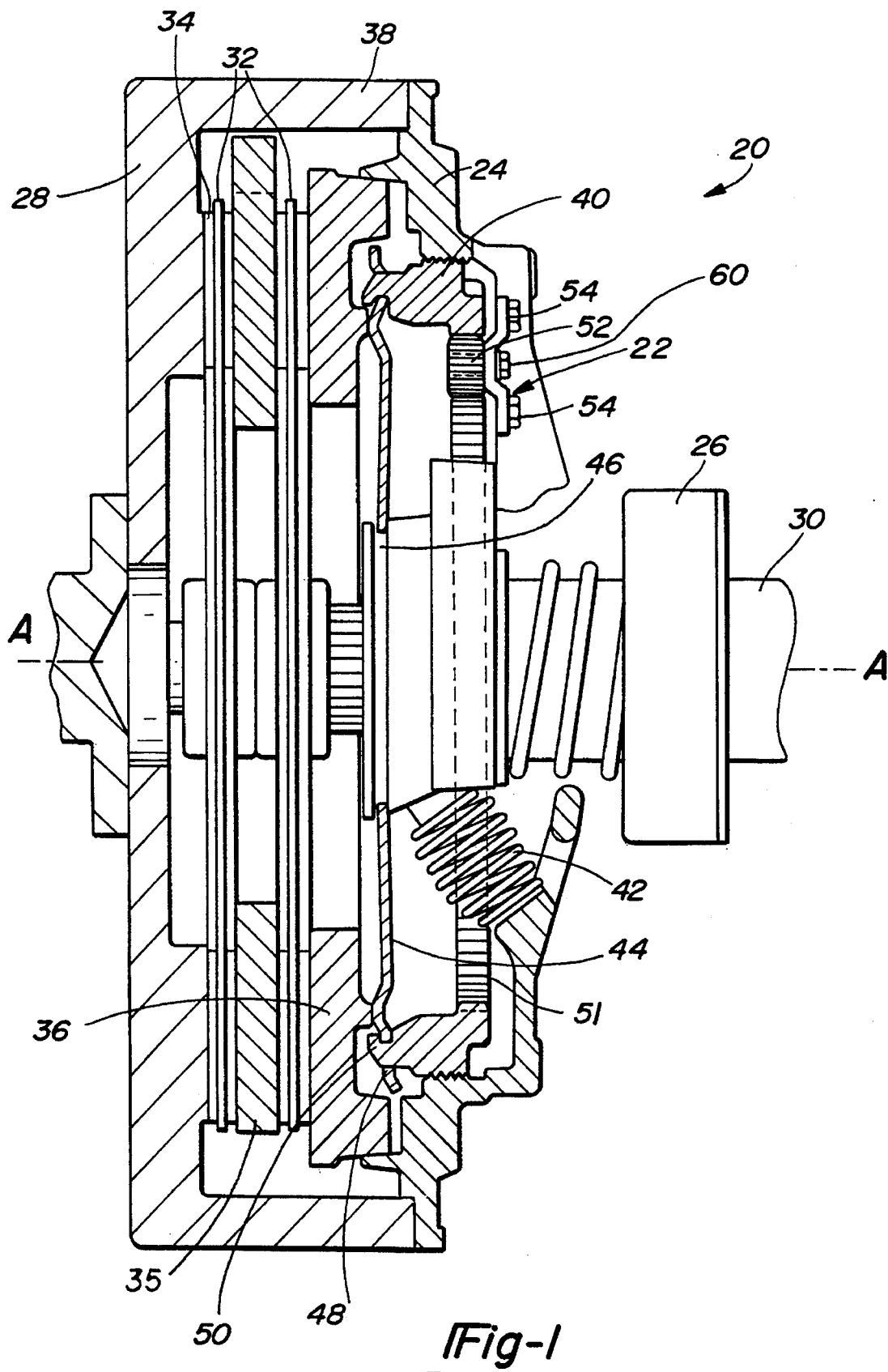
FIG. 1 is a cross-sectional view of a torque transmitting device incorporating an adjustment mechanism according to the present invention.

Referring now to FIG. 1 of the drawings, in a preferred embodiment, the torque transmitting device is a friction clutch 20. An adjustment mechanism 22 is provided for manual adjustment of the clutch, which is performed periodically over the life of the clutch. A portion of adjustment mechanism 22 is recessed within a clutch cover 24, and the extent to which any portion of adjustment mechanism 22 extends outwardly away from cover 24 is minimized. Adjustment mechanism 22 effectively provides for manual adjustment of the clutch, without interfering with neighboring components, such as a release assembly 26, during operation of the clutch.

Clutch 20 transmits torque from an engine flywheel 28, which is the driving member, to an axially extending driven shaft 30 of the vehicle transmission. Drive shaft 30 extends along drive axis A—A. A pair of driven discs 32, having a friction surface 34, are splined to drive shaft 30 for axial but non-rotatable movement with respect to the drive shaft. Driven discs 32 and an intermediate plate 35 are interposed between flywheel 28 and a pressure plate 36.

Fixed to flywheel 28 for rotation therewith is a housing 38. Cover 24 is coupled to housing 38 for non-rotatable movement with respect to the housing. An annular adjusting ring 40 is threaded to an inner diameter of cover 24.

As will be apparent to those skilled in the art, leftward movement of pressure plate 36 results in frictional engagement of interleaved clutch members, namely, flywheel 28, driven discs 32, intermediate plate 35 and pressure plate 36. When engaged in this manner, these elements of the clutch rotate together transmitting the rotation of flywheel 28 to drive shaft 30. In a normally engaged position of clutch 20, the interleaved elements of clutch 20 are urged together under the force of a biasing member, such as springs 42.

The standard clutch release assembly 26 is employed for rightward movement of pressure plate 36 to effect clutch disengagement. Such movement is generally achieved by the depression of a clutch pedal in a vehicle cab. To effect disengagement, a plurality of levers 44 are interposed between release assembly 26 and adjusting ring 40. A radially inner portion of each lever 44 is received in a peripheral groove 46 formed in release assembly 26. A radially outer portion of each lever 44 has an opening 48 that receives a leftwardly projecting pivot extension 50 formed on a left face of adjusting ring 40.

Lever 44 pivotally and pressingly engages pressure plate 36. Thus, leftward movement of release assembly 26 causes lever 44 to apply a leftward force on the pressure plate to engage the interleaved clutch members. As wear occurs on the friction surfaces 34 of driven discs 32, pressure plate 36 must travel an additional distance to the left in order to engage the clutch. To accommodate for this wear, adjusting ring 40 is rotated with respect to cover 24, resulting in leftward movement of the adjusting ring with respect to the cover.

Adjusting ring 40 is manually rotated by way of adjustment mechanism 22. Teeth 51 formed on an inner diameter of adjusting ring 40 cooperate with a gear 52 of adjustment mechanism 22 for manual rotation of the adjusting ring. As adjusting ring is rotated along the threads of cover 24, it is moved leftward with respect to the cover.

FIG. 2 illustrates the components of adjustment mechanism 22, which is directly secured to cover 24 by fastening members 54. Adjustment mechanism 22 is comprised of a support bracket 56, a rotation assembly 58 that includes gear 52, and a locking plate 60.

As illustrated in FIGS. 2–4, support bracket 56 includes a generally planar web portion 62, and a pair of laterally spaced side wall 64 extending from opposite ends of said web portion defining a generally U-shaped channel. Support bracket 56 further includes a pair of flanges 66 that include an aperture 67 for securing the adjustment mechanism to cover 24. One flange 66 extends from an end of each side wall 64 opposite web portion 62. Each flange 66 extends along a plane generally parallel to web portion but spaced from web portion 62 by a dimension equal to the depth of the channel. Each flange 66 extends in an opposite direction away from the channel.

As shown in FIG. 4, flange 66 has an attachment surface 68 and an outer surface 70. Attachment surface 68 faces towards the general direction of gear 52 and is adapted to contact a surface of cover 24. Outer surface 70 is opposite surface 68. A flange outer surface plane 72 extends along surface 70 of each flange 66, and contacts only outer surface 70 of each flange 66. Flange outer surface plane 72 does not intersect any portion of the support bracket.

Rotation assembly 58 includes an elongated member 74 having a head 76 at one end thereof, and gear 52 at the other end thereof. Head 76 includes a plurality of flats 78. Elongated member 58 extends through an aperture 80 and support bracket 56 such that head 76 is on one side of the support bracket, and gear 52 is on the other side of the support bracket. Elongated member 58 is rigidly secured to gear 52 along splines, but rotates freely within aperture 80 of support bracket. As seen in FIG. 4, head 76 is completely received with the channel of support bracket 56, and does not extend beyond flange surface plane 72.

Locking plate 60 is secured to support bracket 56 by a fastening member 82, including a washer 84. Fastening member 82 extends through an aperture 86 that is spaced from aperture 80 used for rotational assembly 58. An end of locking plate includes a non-circular aperture 88. Aperture 88 is dimensioned and shaped to cooperate with flats 78 on head 76 of rotation assembly 58. Locking plate 60 is easily positioned and removed to selectively prevent rotation of gear 52, and thus, maintain clutch 20 in an adjusted position. Locking plate 60 provides a simple, low profile structure to selectively prevent rotation of rotation assembly 58. No portion of the locking plate 60 or fastening member 82 extends beyond flange surface plane 72.

In operation, locking plate 60 is removed prior to adjustment of clutch. A tool is inserted over head 76 of rotation assembly 58. Head 76 is manually rotated, resulting in rotation of gear 52, and thus, rotation of adjusting ring 40 with respect to clutch cover 24. After proper adjustments are made, locking plate 60 is replaced to maintain the clutch in its new adjusted position.

Although only one preferred embodiment has been detailed and described herein, the following claims envision a number of other alternatives which may fall within the spirit and scope of the invention.

What is claimed is:

1. An adjustment mechanism comprising:

a support bracket having a wall defining a generally U-shaped channel, said wall having two ends, a first flange extending from one end of said wall, a second flange extending from the other end of said wall opposite said first flange, said first flange being generally parallel to said second flange, an outer surface plane being defined as a plane extending over an opening of said channel and contacting only an outer surface of each said first and second flanges; and a rotation assembly having an elongated member, a gear, and a rotational head, said elongated member having two ends and extending through an aperture in said wall of said support bracket, said gear being secured to one end of said elongated member, said rotational head being on the other end of said elongated member on a side of said wall opposite said gear, said rotational head being entirely within said channel of said support bracket such that no portion of said rotation assembly extends from said channel of said support bracket beyond said outer surface plane.

2. An adjustment mechanism comprising:

a support bracket having a web, a first side wall extending from one end of said web, and a second side wall extending from another end of said web, said first side wall being spaced from said second side wall to define a generally U-shaped channel, a first flange extending from an end of said first side wall opposite said web, said first flange being generally parallel to said web, a second flange extending from an end of said second side wall opposite said web, said second flange being generally parallel to said web, an outer surface plane being defined as a plane extending over an opening of said channel and contacting only an outer surface of each said first and second flanges; and a rotation assembly having an elongated member, a gear, and a rotational head, said elongated member extending through an aperture in said web of said support bracket, said elongated member having said gear secured to one end thereof, said gear being on one side of said support bracket, said elongated member having said rotational head on the other side thereof, said rotational head being on an opposite side of said support bracket, wherein the entire said rotational head of said rotation assembly is within said channel of said support bracket such that no portion of said rotation assembly extends from said channel of said support bracket beyond said outer surface plane.

3. The adjustment mechanism of said claim 2, wherein said first flange, said second flange and said web extend along parallel planes.

4. The adjustment mechanism of claim 2, wherein a first fastening member extends through said first flange and a second fastening member extends through said second flange to secure said adjustment mechanism to a structure.

5. The adjustment mechanism of claim 2, wherein a locking plate is secured to said support bracket by a fastening member spaced from said rotation assembly, said locking plate extending to and contacting said rotation assembly, said locking plate cooperating with said rotation assembly to selectively prevent rotation of said rotation assembly.

6. The adjustment mechanism of claim 5, wherein said rotational head of said rotation assembly includes a plurality of flats, said locking plate having a non-circular aperture, said rotational head extending through said non-circular aperture, said non-circular aperture being dimensioned and shaped to cooperate with said flats of said rotational head to prevent rotation of said rotation assembly with respect to said support bracket.

7. In a friction assembly having a cover, an adjusting ring threaded to the cover, and an adjustment mechanism for rotation of the adjusting ring with respect to the cover, said adjustment mechanism comprising:

a support bracket secured to the cover, said support bracket having a web, a first side wall extending from one end of said web, and a second side wall extending from another end of said web, said first side wall being spaced from said second side wall to define a generally U-shaped channel, a first flange extending from an end of said first side wall opposite said web, said first flange being generally parallel to said web, a second flange extending from an end of said second side wall opposite said web, said second flange being generally parallel to said web, an outer surface plane being defined as a plane extending over an opening of said channel and contacting only an outer surface of each said first and second flanges;

a rotation assembly having an elongated member, a gear, and a rotational head, said elongated member extending through an aperture in said web of said support bracket, said gear being secured to one end of said elongated member, said head being on the opposite end thereof, wherein the entire said head of said rotation assembly is received within said channel of said support bracket such that no portion of said rotation assembly extends from said channel of said support bracket beyond said outer surface plane; and a locking plate is secured to said support bracket by a fastening member spaced from said rotation assembly, said locking plate extending to and contacting said rotation assembly, said locking plate cooperating with said rotation assembly to selectively prevent rotation of said rotation assembly, wherein no portion of said locking plate extends outwardly away from said channel of said support bracket beyond said outer surface plane.

8. The adjustment mechanism of claim 7, wherein said rotational head of said rotation assembly includes a plurality of flats, said locking plate being generally planar and having a non-circular aperture at one end thereof, said rotational head extending through said non-circular aperture, said non-circular aperture being dimensioned and shaped to cooperate with said flats of said rotational head to prevent rotation of said rotation assembly with respect to said support bracket.

9. In a friction torque device comprising:

a driving member;

a cover coupled to said driving member for rotation with said driving member;

a pressure plate coupled to said cover for rotation with said cover;

an axially extending driven shaft;

a driven member coupled to said driven shaft for rotation with said driven shaft, said driven member interposed between said driving member and the pressure plate;

a release assembly extending about said driven shaft;

an adjusting ring threaded to said cover for rotation with said cover;

a radially extending lever interposed between said release assembly and said adjustment ring, said lever being coupled to an axial end of said adjustment ring, said lever cooperating with said axial end of said adjusting ring and said release assembly to move said pressure plate to engage and disengage said driven member and said driving member; and an adjustment mechanism secured to said cover and comprising a support bracket, a rotation assembly and a locking plate, said support bracket being secured to said cover, said support bracket having a web, a first side wall extending from one end of said web, and a second side wall extending from another end of said web, said first side wall being spaced from said second side wall to define a generally U-shaped channel, a first flange extending from an end of said first side wall opposite said web, said first flange being generally parallel to said web, a second flange extending from an end of said second side wall opposite said web, said second flange being generally parallel to said web, an outer surface plane being defined as a plane extending over an opening of said channel and contacting only an outer surface of each said first and second flanges, said rotation assembly having an elongated member, a gear, and a rotational head, said elongated member extending through an aperture in said web of said support bracket, said gear cooperating with said adjusting ring for rotation of said adjusting ring with respect to said cover, said head of said rotation assembly being received is within said channel of said support bracket such that no portion of said rotation assembly extends from said channel of said support bracket beyond said outer surface plane.

10. The adjustment mechanism of claim 9, wherein a first fastening member extends through said first flange and a second fastening member extends through said second flange to secure said adjustment mechanism to said cover.

11. The adjustment mechanism of claim 9, wherein a locking plate is secured to said support bracket by a fastening member spaced from said rotation assembly, said locking plate extending to and contacting said rotation assembly, said locking plate cooperating with said rotation assembly to selectively prevent rotation of said rotation assembly.

12. The adjustment mechanism of claim 11, wherein said rotational head of said rotation assembly includes a plurality of flats, said locking plate having a non-circular aperture, said rotational head extending through said non-circular apertures said non-circular aperture being dimensioned and shaped to cooperate with said flats of said rotational head to prevent rotation of said rotation assembly with respect to said support bracket.

* * * * *